(12) United States Patent
Joshi (10) Patent No.: US 7,423,977 B1
(45) Date of Patent: Sep. 9, 2008

(54) SMOOTHING ALGORITHM FOR ROUND TRIP TIME (RTT) MEASUREMENTS

(75) Inventor: Prajakta S. Joshi, Cupertino, CA (US)

(73) Assignee: Foundry Networks Inc., Santa Clara, CA (US)

( * ) Notice: Subject to any disclaimer, the term of this patent is extended or adjusted under 35 U.S.C. 154(b) by 821 days.

(21) Appl. No.: 10/924,552

(22) Filed: Aug. 23, 2004

(51) Int. Cl.
*H04L 12/26* (2006.01)
*H04J 3/06* (2006.01)
(52) U.S. Cl. .................. 370/252; 370/231; 370/236; 370/248; 370/249; 370/503; 370/509
(58) Field of Classification Search ......... 370/229–232, 370/235–236.2, 241, 249, 252, 389, 395.1, 370/395.2, 395.21, 400, 465, 503, 508, 519, 370/248; 709/220–230, 232–235
See application file for complete search history.

(56) References Cited

U.S. PATENT DOCUMENTS

| 5,031,094 | A | 7/1991 | Toegel et al. ............... 364/200 |
| 5,359,593 | A | 10/1994 | Derby et al. .................. 370/17 |
| 5,948,061 | A | 9/1999 | Merriman et al. ............ 709/219 |
| 5,951,634 | A | 9/1999 | Sitbon et al. ................. 709/105 |
| 6,006,269 | A | 12/1999 | Phaal |
| 6,006,333 | A | 12/1999 | Nielsen |
| 6,092,178 | A | 7/2000 | Jindal et al. .................... 712/27 |
| 6,112,239 | A | 8/2000 | Kenner et al. ................ 709/224 |
| 6,115,752 | A | 9/2000 | Chauhan ..................... 709/241 |
| 6,128,279 | A | 10/2000 | O'Neil et al. ................ 370/229 |

(Continued)

OTHER PUBLICATIONS

"TCP Nice: A Mechanism for Background Transfers," Venkataramani, A., Kokku, R., Dalhin, M., Proceedings of the Fifth Symposium on Operating Systems Design and Implementation (OSDI'02), 2002, p. 329-43, ISBN: 1-931971-06-4. Publisher: USENIX Assoc, Berkeley, CA, USA.*

(Continued)

*Primary Examiner*—Aung S. Moe
*Assistant Examiner*—Redentor Pasia
(74) *Attorney, Agent, or Firm*—Seed IP Law Group PLLC (57) ABSTRACT

A smoothing algorithm for round trip time (RTT) measurements is provided to a network device to effectively deal with variations or other potential anomalies that may occur in RTT measurements. The algorithm involves: first determining what should be considered a very high or a very small value for a RTT sample. If a new RTT sample is in an acceptable range, then the network device performs a relatively basic smoothing. If the new RTT sample is much higher than a current RTT value, then the network device ignores the value of this RTT sample a few times. If the network device still detects this large value after ignoring that value for some time, then the network device factors this value into the current RTT value using an additive increase. Similarly, if the value of the new RTT sample is much lower than current RTT value, the network device ignores the value of the new RTT sample a few times. If the network device still sees this small/low value after ignoring that value for sometime, then the network device factors this value into the current RTT value using a multiplicative decrease. An effective RTT value results, which can be used singly or in combination with other metrics to load balance network traffic.

28 Claims, 7 Drawing Sheets

U.S. PATENT DOCUMENTS

| | | | | |
|---|---|---|---|---|
| 6,128,642 | A | 10/2000 | Doraswamy et al. | 709/201 |
| 6,167,445 | A | 12/2000 | Gai et al. | |
| 6,167,446 | A | 12/2000 | Lister et al. | 709/223 |
| 6,182,139 | B1 | 1/2001 | Brendel | |
| 6,233,604 | B1 | 5/2001 | Van Horne et al. | 709/203 |
| 6,286,039 | B1 | 9/2001 | Van Horne et al. | 709/221 |
| 6,286,047 | B1 | 9/2001 | Ramanathan et al. | 709/224 |
| 6,324,580 | B1 | 11/2001 | Jindal et al. | 709/228 |
| 6,327,622 | B1 | 12/2001 | Jindal et al. | |
| 6,336,137 | B1 | 1/2002 | Lee et al. | |
| 6,381,627 | B1 | 4/2002 | Kwan et al. | 709/201 |
| 6,389,462 | B1 | 5/2002 | Cohen et al. | 709/218 |
| 6,427,170 | B1 | 7/2002 | Sitaraman et al. | 709/226 |
| 6,434,118 | B1* | 8/2002 | Kirschenbaum | 370/236.1 |
| 6,438,652 | B1 | 8/2002 | Jordan et al. | 711/120 |
| 6,449,657 | B2 | 9/2002 | Stanbach, Jr. et al. | 709/245 |
| 6,470,389 | B1 | 10/2002 | Chung et al. | 709/227 |
| 6,480,508 | B1 | 11/2002 | Mwikalo et al. | 370/475 |
| 6,490,624 | B1 | 12/2002 | Sampson et al. | |
| 6,549,944 | B1 | 4/2003 | Weinberg et al. | 709/224 |
| 6,578,066 | B1 | 6/2003 | Logan et al. | 709/105 |
| 6,606,643 | B1 | 8/2003 | Emens et al. | 709/203 |
| 6,681,232 | B1 | 1/2004 | Sistanizadeh et al. | 707/104.1 |
| 6,681,323 | B1 | 1/2004 | Fontanesi et al. | 713/1 |
| 6,691,165 | B1 | 2/2004 | Bruck et al. | |
| 6,745,241 | B1 | 6/2004 | French et al. | |
| 6,772,211 | B2 | 8/2004 | Lu et al. | |
| 6,789,125 | B1 | 9/2004 | Aviani et al. | 709/238 |
| 6,826,198 | B2 | 11/2004 | Turina et al. | |
| 6,839,700 | B2 | 1/2005 | Doyle et al. | |
| 6,850,984 | B1 | 2/2005 | Kalkunte et al. | |
| 6,874,152 | B2 | 3/2005 | Vermeire et al. | |
| 6,879,995 | B1 | 4/2005 | Chinta et al. | |
| 6,898,633 | B1 | 5/2005 | Lyndersay et al. | 709/226 |
| 6,901,081 | B1* | 5/2005 | Ludwig | 709/235 |
| 6,928,485 | B1 | 8/2005 | Krishnamurthy et al. | |
| 6,963,914 | B1 | 11/2005 | Breibart et al. | 709/226 |
| 6,963,917 | B1 | 11/2005 | Callis et al. | 709/227 |
| 6,985,956 | B2 | 1/2006 | Luke et al. | |
| 6,987,763 | B2 | 1/2006 | Rochberger et al. | 370/389 |
| 6,996,615 | B1 | 2/2006 | McGuire | |
| 6,996,616 | B1 | 2/2006 | Leighton et al. | |
| 7,000,007 | B1 | 2/2006 | Valenti | 709/219 |
| 7,020,698 | B2 | 3/2006 | Andrews et al. | 709/223 |
| 7,020,714 | B2* | 3/2006 | Kalyanaraman et al. | 370/229 |
| 7,028,083 | B2 | 4/2006 | Levine et al. | |
| 7,032,010 | B1 | 4/2006 | Swildens et al. | 709/219 |
| 7,036,039 | B2 | 4/2006 | Holland | |
| 7,058,717 | B2 | 6/2006 | Chao et al. | |
| 7,062,642 | B1 | 6/2006 | Langrind et al. | |
| 7,086,061 | B2 | 8/2006 | Joshi et al. | 718/105 |
| 7,089,293 | B2 | 8/2006 | Grosner et al. | |
| 7,136,932 | B1 | 11/2006 | Schneider | |
| 7,139,242 | B2 | 11/2006 | Bays | |
| 7,177,933 | B2 | 2/2007 | Foth | |
| 7,185,052 | B2 | 2/2007 | Day | |
| 7,197,547 | B1 | 3/2007 | Miller et al. | |
| 7,206,806 | B2 | 4/2007 | Pineau | |
| 7,225,272 | B2 | 5/2007 | Kelley et al. | |
| 7,240,015 | B1 | 7/2007 | Karmouch et al. | |
| 7,240,100 | B1 | 7/2007 | Wein et al. | |
| 7,254,626 | B1 | 8/2007 | Kommula et al. | |
| 7,257,642 | B1 | 8/2007 | Bridger et al. | |
| 7,260,645 | B2 | 8/2007 | Bays | |
| 7,321,926 | B1 | 1/2008 | Zhang et al. | |
| 2001/0052016 | A1 | 12/2001 | Skene et al. | 709/226 |
| 2002/0026551 | A1 | 2/2002 | Kamimaki et al. | 710/260 |
| 2002/0038360 | A1 | 3/2002 | Andrews et al. | |
| 2002/0059464 | A1* | 5/2002 | Hata et al. | 709/247 |
| 2002/0062372 | A1 | 5/2002 | Hong et al. | 709/225 |
| 2002/0078233 | A1 | 6/2002 | Biliris et al. | 709/238 |
| 2002/0091840 | A1 | 7/2002 | Pulier et al. | 709/228 |
| 2002/0112036 | A1 | 8/2002 | Bohannon et al. | 709/220 |
| 2002/0120743 | A1 | 8/2002 | Shabtay et al. | 709/226 |
| 2002/0124096 | A1* | 9/2002 | Loguinov et al. | 709/230 |
| 2002/0133601 | A1 | 9/2002 | Kennamer et al. | |
| 2002/0150048 | A1* | 10/2002 | Ha et al. | 370/231 |
| 2002/0154600 | A1* | 10/2002 | Ido et al. | 370/216 |
| 2002/0188862 | A1 | 12/2002 | Trethewey et al. | 713/201 |
| 2002/0194324 | A1 | 12/2002 | Guha | |
| 2002/0194335 | A1 | 12/2002 | Maynard | 709/225 |
| 2003/0018796 | A1* | 1/2003 | Chou et al. | 709/231 |
| 2003/0031185 | A1* | 2/2003 | Kikuchi et al. | 370/400 |
| 2003/0035430 | A1 | 2/2003 | Islam et al. | |
| 2003/0065711 | A1 | 4/2003 | Acharya et al. | 709/203 |
| 2003/0065763 | A1 | 4/2003 | Swildens et al. | 709/224 |
| 2003/0105797 | A1 | 6/2003 | Dolev et al. | 709/105 |
| 2003/0135509 | A1 | 7/2003 | Davis et al. | 707/100 |
| 2003/0154239 | A1 | 8/2003 | Davis et al. | |
| 2003/0210686 | A1 | 11/2003 | Terrell et al. | 370/389 |
| 2003/0210694 | A1 | 11/2003 | Jayaraman et al. | 370/392 |
| 2003/0229697 | A1 | 12/2003 | Borella | |
| 2004/0019680 | A1 | 1/2004 | Chao et al. | |
| 2004/0024872 | A1 | 2/2004 | Kelley et al. | 709/225 |
| 2004/0064577 | A1* | 4/2004 | Dahlin et al. | 370/230 |
| 2004/0194102 | A1 | 9/2004 | Neerdaels | |
| 2004/0249939 | A1 | 12/2004 | Amini et al. | |
| 2004/0249971 | A1 | 12/2004 | Klinker | |
| 2005/0021883 | A1 | 1/2005 | Shishizuka et al. | 710/20 |
| 2005/0033858 | A1 | 2/2005 | Swildens et al. | 709/232 |
| 2005/0086295 | A1 | 4/2005 | Cunningham et al. | 709/203 |
| 2005/0149531 | A1 | 7/2005 | Srivastava | 707/10 |
| 2005/0169180 | A1* | 8/2005 | Ludwig | 370/519 |
| 2005/0286416 | A1* | 12/2005 | Shimonishi et al. | 370/231 |
| 2006/0036743 | A1 | 2/2006 | Deng et al. | |

OTHER PUBLICATIONS

Genova, Z., et al., "Challenges to URL Switching for Implementing Globally Distributed Web Sites," Department of Computer Science and Engineering, University of South Florida, pp. 1-9, Aug. 11, 2000.

U.S. Appl. No. 09/670,487, filed Sep. 26, 2000, Hsu et al.

U.S. Appl. No. 10/206,580, filed Jul. 25, 2002, Kommula et al.

U.S. Appl. No. 10/214,921, filed Aug. 7, 2002, Kommula.

U.S. Appl. No. 10/305,823, filed Nov. 27, 2002, Joshi et al.

U.S. Appl. No. 10/376,903, filed Feb. 28, 2003, Kommula.

U.S. Appl. No. 10/377,364, filed Feb. 28, 2003, Kommula.

U.S. Appl. No. 10/674,627, filed Sep. 29, 2003, Joshi.

U.S. Appl. No. 10/839,919, filed May 6, 2004, Joshi.

U.S. Appl. No. 10/840,496, filed May 6, 2004, Joshi.

U.S. Appl. No. 11/429,177, filed May 5, 2006, Joshi et al.

Alteon WebSystems, "PCD White Paper," *AlteonWebSystems*, pp. 1-8, Mar. 2001.

Cardellini, V., et al., "Dynamic Load Balancing on Web-server Systems," *IEEE Internet Computing*, 3(3):28-39, May-Jun. 1999.

Foundry Networks, Inc., "Server Load Balancing in Today's Web-enabled Enterprises," *White Paper*, pp. 1-10, Apr. 2002.

Genova, Z., et al., "Challenges in URL Switching for Implementing Globally Distributed Web Sites," *IEEE*, pp. 89-94, 2000.

Bestavros, Azer, "WWW Traffic Reduction and Load Balancing through Server-Based Caching," *IEEE Concurrency*, pp. 56-67, Jan.-Mar. 1997.

Paul, Arindam et al., "Balancing Web Server Load for Adaptable Video Distribution," *IEEE* pp. 469-476, 2000.

Albitz, P., et al., "DNS and BIND in a Nutshell," O'Reilly & Associates, Sebastopol, CA, 1992, pp. 214-215.

Alteon Systems, "Alteon WebSystems Introduces New Layer 4+ Switching Technology that Speeds User Access to Internet Servers," Dec. 7, 1998, retrieved Nov. 5, 2002, from http://web.archive.org/web/20000919190409/www.alteonwebsystems.com/press/releases/1998/120798.asp, pp. 1-4.

Alteon WebSystems, Inc., "Enhancing Web User Experience with Global Server Load Balancing," Jun. 1999, 8 pages.

Krapf, E., "Alteon's Global Server Load Balancing," *Business Communications Review*, Jan. 1999, p. 60, retrieved Oct. 25, 2002, from http://www.bcr.com/bcrmag/1999/01/p60.asp, 3 pages.

Nortel Networks, "Alteon Personal Content Director," © 2001, can be retrieved from http://www.nortelnetworks.com/personalinternet, 4 pages.

IBM Corp., *IBM WebSphere Performance Pack: Load Balancing with IBM SecureWay Network Dispatcher*, First Edition, Chapters 1, 2, 4, and 8, Oct. 1999.

IBM Corp., *SecureWay® Network Dispatcher: User's Guide—Version 2.1 for AIX, Solaris, and Windows NT*, Third Edition, Chapters 3, 4, 9, 10, 11, and Appendices C & E, Mar. 1999.

Yerxa, G., "ACElerate on Fast Track for Load-Balancing," Mar. 8, 1999, retrieved Nov. 5, 2002, from http://www.networkcomputing.com/1005/1005sp2.html, pp. 1-4.

Cisco Document, "Configuring the CSS Domain Name Service,", posted on Dec. 2000, Cisco Systems Inc., http://www.ciscosystems.com, pp. 1-13.

Venkataramani, A., et al., "TCP Nice: A Mechanism for Background Transfer," Proceedings of the Fifth Symposium on Operating Systems Design and Implementation (OSDI'02), ISBN:1-931971-06-4, 329-343, 2002.

\* cited by examiner

SMOOTHING ALGORITHM FOR ROUND TRIP TIME (RTT) MEASUREMENTS

TECHNICAL FIELD

This disclosure relates generally to round trip time (RTT) measurements for a network. More particularly but not exclusively, the present disclosure relates to techniques to effectively smooth RTT measurements, which are usable for RTT metrics for a variety of network applications.

BACKGROUND INFORMATION

Under the Transmission Control Protocol/Internet Protocol (TCP/IP), when a client provides a symbolic name (a Uniform Resource Locator or URL) to request access to an application program or another type of resource, the host name portion of the URL needs to be resolved into an IP address of a server for that application program or resource. For example, the URL (e.g., http://www.foundrynet.com/index.htm) includes a host name portion www.foundrynet.com that needs to be resolved into an IP address. The client first provides the host name portion to a local name resolver, which then queries a local Domain Name System (DNS) server to obtain a corresponding IP address. If a corresponding IP address is not locally cached at the time of the query, or if the time-to-live (TTL) of a corresponding IP address cached locally has expired, the DNS server then acts as a resolver and dispatches a recursive query to another DNS server. This process is repeated until an authoritative DNS server for the domain (e.g., foundrynet.com, in this example) is reached. The authoritative DNS server returns one or more IP addresses, each corresponding to an address at which a server hosting the application ("host server") under the host name can be reached. These IP addresses are propagated back via the local DNS server to the original resolver. The application at the client then uses one of the IP addresses to establish a TCP connection with the corresponding host server. Each DNS server caches the list of IP addresses received from the authoritative DNS server for responding to future queries regarding the same host name, until the TTL of the IP addresses expires.

To provide some load sharing among the host servers, global server load balancing (GSLB) switches are sometimes used as proxies for authoritative DNS servers, together with one or more site switches each associated with one or more host servers. Each site switch provides the GSLB switch with current site-specific information ("metrics") regarding access conditions to the host servers associated with the site switches. The GSLB switch then processes the addresses returned by the DNS server using the metrics compiled from the site switches and provides an ordered address list having the optimum address for access listed at the top. An example of a GSLB system and description of associated metrics are disclosed in U.S. application Ser. No. 10/376,903, entitled "GLOBAL SERVER LOAD BALANCING," filed Feb. 28, 2003, assigned to the same assignee as the present application, and which is incorporated herein by reference in its entirety.

There are other examples of server load balancing systems and techniques, apart from those that use GSLB. At least some of these GSLB and/or other load balancing systems use round trip time (RTT) measurements in determining an optimum address to provide to a client. For a GSLB system, the site switches gather RTT and report these measurements to the GSLB switch. The GSLB switch maintains a database for these RTT measurements. In particular, each entry in this database includes the following information:

Network prefix for which the RTT was reported;
The site switch that reported this RTT; and
The RTT value.

Whenever a site switch reports a new RTT value for a network prefix, this value is smoothed into the existing RTT value in the RTT database. Generally, the most common smoothing algorithm used is to compute the effective RTT value as a sum of 90% of the existing RTT value and 10% of the new RTT value, for example. This algorithm is very simplistic in nature and not able to adapt quickly to large variances in RTT values or changes in RTT measurements. Further, it does not provide flexibility to customize the RTT smoothing based on the RTT characteristics of different networks.

BRIEF SUMMARY OF THE INVENTION

One aspect provides a method that includes defining a maximum deviation allowed for any round trip time (RTT) sample relative to a current RTT value. The method computes a deviation of a RTT sample relative to the current RTT value. If the computed deviation is greater than zero and an absolute value of the computed deviation is greater than the maximum deviation allowed, then the method performs a first type of RTT smoothing operation wherein the RTT sample is factored into the current RTT value using an additive increase. If the computed deviation is less than zero and greater than the maximum deviation allowed, then the method performs a second type of RTT smoothing operation wherein the RTT sample is factored into the current RTT value using a multiplicative decrease. Otherwise, the method performs a third type of RTT smoothing operation wherein a percentage of the RTT sample is factored into a percentage of the current RTT value.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Embodiments of techniques to provide a smoothing algorithm for RTT measurements are described herein. In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects.

Reference throughout this specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

For purposes of simplicity of explanation and illustration, an embodiment will be described in the context of a smoothing algorithm for RTT measurements that can be used in a GSLB system. However, alternatively or additionally to GSLB systems, it is understood that embodiments can also be applied to smooth RTT samples for other types of load balancing systems or other applications where an adaptive RTT smoothing algorithm can provide some benefit.

As an overview, one embodiment provides a smoothing algorithm for RTT measurements to effectively deal with variances that may occur in RTT measurements. The algorithm of an embodiment involves: first determining what should be considered a very high or a very small value for a RTT sample by a GSLB switch. If a new RTT sample is in an acceptable range, then the GSLB switch will perform a relatively basic smoothing. If the new RTT sample is much higher than a current RTT value, then the GSLB switch will ignore the value of this RTT sample a few times. If the GSLB switch still detects this large value after ignoring that value for some time, then the GSLB switch will factor this value into the current RTT value (e.g., the GSLB switch will add the value of the new RTT sample into the current RTT value in an additive increase). Similarly, if the value of the new RTT sample is much lower than current RTT value, the GSLB switch will ignore the value of the new RTT sample a few times. If the GSLB switch still sees this small/low value after ignoring that value for sometime, then the GSLB switch will factor this value into the current RTT value using a multiplicative decrease.

Figure 1:
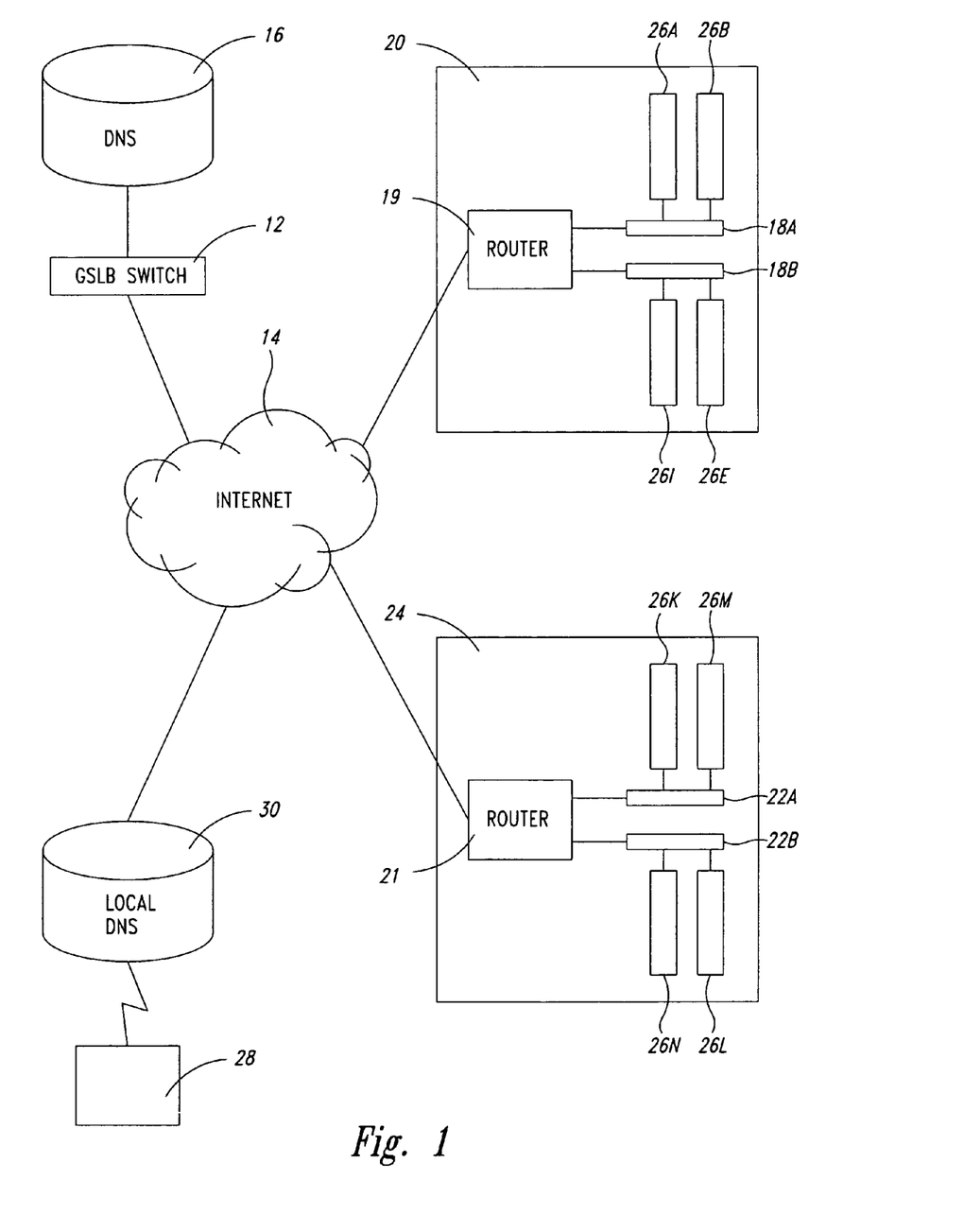
FIG. 1 illustrates a GSLB system in which an embodiment may be implemented.

FIG. 1 illustrates one example global server load balancing system with which an embodiment may be implemented. As shown in FIG. 1, a GSLB switch 12 (i.e., a load balancing switch) is connected to an Internet 14 and acts as a proxy to an authoritative Domain Name System (DNS) server 16 for a domain "foundrynet.com" (for example). That is, while the authoritative DNS server 16 provides the actual DNS service, the IP address known to the rest of the Internet 14 for the authoritative DNS server 16 of the domain "foundrynet.com" is a virtual IP (VIP) address configured on the GSLB switch 12. Of course, authoritative DNS server 16 can also act simultaneously as an authoritative DNS for other domains. The GSLB switch 12 communicates, via the Internet 14, with site switches 18A and 18B at site 20, site switches 22A and 22B at site 24, and any other similarly configured site switches. The site switches 18A, 18B, 22A and 22B are shown, for example, connected to routers 19 and 21 respectively and to servers 26A, . . . , 26I, . . . 26N. Some or all of the servers 26A, . . . , 26I, . . . , 26N may host application server programs (e.g., http and ftp and others). These host servers are reached through the site switches 18A, 18B, 22A and 22B using one or more virtual IP addresses configured at the site switches, which act as proxies to the host servers.

A suitable switch for implementing either the GSLB switch 12 or any of the site switches 18A, 18B, 22A and 22B is the ServerIron® (SI) product available from Foundry Networks, Inc. of San Jose, Calif. Throughout this description and in the figures, the GSLB switch will be described as the network device that can provide and implement the various load balancing (e.g., host-level and/or global load balancing policies) of an embodiment. It is understood that this use of the GSLB or SI switch is merely for purposes of illustration and explanation. Any suitable non-SI switch or non-SI network device can be used to implement the various geographic features and functions described herein. A router is one example.

FIG. 1 also shows a client program 28 connected to the Internet 14, and that communicates with a local DNS server 30. When a browser on the client program 28 requests a web page, for example, using a Universal Resource Locator (URL), such as http://www.foundrynet.com/index.htm, a query is sent to the local DNS server 30 to resolve the symbolic host name www.foundrynet.com to an IP address of a host server. The client program 28 receives from the DNS server 30 a list of IP addresses corresponding to the resolved host name. This list of IP addresses is either retrieved from the local DNS server 30's cache, if the TTL of the responsive IP addresses in the cache has not expired, or obtained from the GSLB switch 12, as a result of a recursive query.

Unlike the prior art, however, this list of IP addresses is ordered by the GSLB switch 12 based on performance metrics. The GSLB switch 12 of one embodiment can use at least some of the following metrics to evaluate the server IP addresses in a DNS reply:

The server's health (including Layer 4 and application health checks)

The weighted IP value assigned to an IP address (i.e., an administratively configured traffic distribution method for the GSLB switch 12 based on weights for IP addresses)

The weighted site value assigned to a site (i.e., an administratively configured traffic distribution method for the GSLB switch 12 based on weights for GSLB sites)

The site switch's session capacity threshold

The IP address with the highest number of active bindings (preference for the IP address with the highest number of active bindings)

The RTT between the site switches 18A, 18B, 22A or 22B and the DNS client's sub-net The geographic location of the server The connection load (e.g., the site switch's average number of new connections per second)

The site switch's available session capacity

The site switch's flashback speed (e.g., how quickly the GSLB switch 12 receives the health check results)

The site switch's administrative preference (e.g., a numeric preference value assigned to influence the GSLB policy by the user if other policy metrics are equal)

The least response selection (i.e., the site switch that has been selected less often than others)

Round robin selection (an alternative to the least response metric).

With respect to the order of application of these metrics in one example embodiment of a GSLB policy or algorithm, the RTT metric is applied subsequent to the active bindings metric, and before the geographic metric. However, it is understood that the RTT metric of another embodiment may be applied as a single metric in a load balancing algorithm, or in any suitable location in a metric order involving a plurality of metrics.

The specifics of at least some of the above-listed metrics are described in further detail in U.S. application Ser. No. 09/670,487, entitled "GLOBAL SERVER LOAD BALANCING," filed Sep. 26, 2000; in U.S. application Ser. No. 10/206, 580, entitled "GLOBAL SERVER LOAD BALANCING,"

filed Jul. 25, 2002 (disclosing embodiments of a connection-load metric for GSLB); in U.S. application Ser. No. 10/305,823, entitled "DISTRIBUTED HEALTH CHECK FOR GLOBAL SERVER LOAD BALANCING," filed Nov. 27, 2002 (disclosing embodiments for distributing health check tasks to peer metric agents); and in U.S. application Ser. No. 10/376,903, entitled "GLOBAL SERVER LOAD BALANCING," filed Feb. 28, 2003 (disclosing embodiments of weighted site, weighted IP, and active bindings metrics).

Other applications that disclose GSLB features (including metrics) are U.S. application Ser. No. 09/670,487, entitled "GLOBAL SERVER LOAD BALANCING," filed Sep. 26, 2000; U.S. application Ser. No. 10/211,822, entitled "STATISTICAL TRACKING FOR GLOBAL SERVER LOAD BALANCING," filed Aug. 1, 2002; U.S. application Ser. No. 10/377,364, entitled "METHOD AND SYSTEM TO CLEAR COUNTERS USED FOR STATISTICAL TRACKING FOR GLOBAL SERVER LOAD BALANCING, filed Feb. 28, 2003; U.S. application Ser. No. 10/214,921, entitled "CANONICAL NAME (CNAME) HANDLING FOR GLOBAL SERVER LOAD BALANCING, filed Aug. 7, 2002; U.S. application Ser. No. 10/674,627, entitled "GLOBAL SERVER LOAD BALANCING SUPPORT FOR PRIVATE VIP ADDRESSES, filed Sep. 29, 2003; U.S. application Ser. No. 10/840,496, entitled "CONFIGURABLE GEOGRAPHIC PREFIXES FOR GLOBAL SERVER LOAD BALANCING," filed May 6, 2004; and U.S. application Ser. No. 10/839,919, entitled "HOST-LEVEL POLICIES FOR GLOBAL SERVER LOAD BALANCING," filed May 6, 2004; all of which are assigned to the same assignee as the present application and incorporated herein by reference in their entireties. For the sake of brevity, these various metrics (other than the RTT metric) and the manner in which they are used in a GSLB algorithm policy (whether at the host level or at the global level) to identify best sites in a list of IP addresses are only summarized and not described in detail herein. Such additional details may be found in these co-pending applications and in the applications that they reference.

In the remainder of this detailed description, for the purpose of illustrating embodiments only and except where indicated, the list of IP addresses returned are assumed to be the virtual IP addresses configured on the proxy servers at switches 18A, 18B, 22A and 22B (sites 20 and 24). In one embodiment when the authoritative DNS server 16 resolves a host name in a query and returns one or more IP addresses, the GSLB switch 12 determines (using the performance metrics) which site switch would provide the best expected performance (e.g., response time) for the client program 28 and returns the IP address list with a virtual IP address configured at that site switch placed at the top. (Other forms of ranking or weighting the IP addresses in the list can also be possible.) The client program 28 can receive the ordered list of IP addresses, and typically selects the first IP address on the list to access the corresponding host server.

With regards to the RTT metric used by some types of GSLB implementations, a GSLB switch learns the RTT information from site switches through any suitable GSLB protocol (or other communication) and uses the information as a metric when comparing IP addresses. The GSLB switch maintains a RTT database cache to store these measurements. That GSLB switch creates a new cache entry to store the RTT measurements reported by the site switches, if a cache entry does not exist already. If a cache entry has already been created, then the GSLB switch updates the RTT value, reported by the site switch, in the existing cache entry. The GSLB switch of such an implementation calculates the new RTT value as follows: the GSLB switch adds 90% of the existing RTT value in the cache entry and 10% of the new RTT sample to obtain the effective RTT value for that cache entry. However, this smoothing algorithm may not be effective in dealing with variances in RTT measurements. For example, consider a situation where the existing RTT value is 20 ms and the new RTT sample is 1 second. Then, the effective RTT value will be 90% of 20 ms and 10% of 1 second (i.e., 118 ms). If this new RTT sample was an anomaly and the subsequent RTT samples are all in the range of 20 ms, then this smoothing mechanism will (inefficiently) take some time to ramp down to 20 ms again.

Accordingly, an embodiment provides a new RTT smoothing algorithm described above. Such an embodiment of the new RTT smoothing algorithm can be implemented in the GSLB system of FIG. 1, and more particularly, implemented in the GSLB switch 12, which is described in more detail with reference to FIG. 2.

Figure 2:
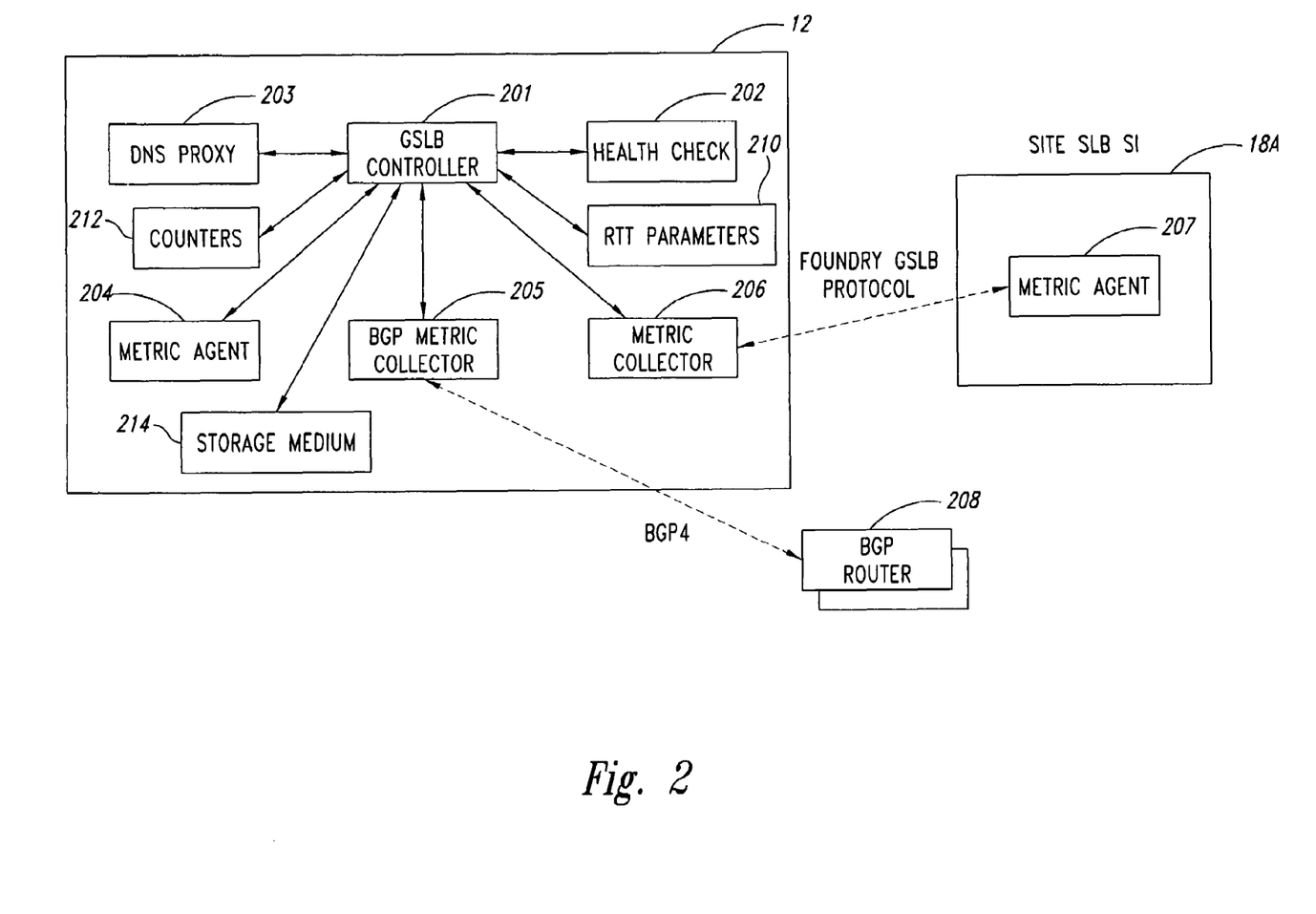
FIG. 2 illustrates a GSLB switch of FIG. 1 according to an embodiment.

In one embodiment, the RTT is computed for the interval between the time when the client program 28 requests a TCP connection to a proxy server configured on a site switch (e.g., the site switch 18A), sending the proxy server a TCP SYN packet, and the time a site switch receives from the client program 28 a TCP ACK packet. That is, in response to the TCP SYN packet, a host server sends a TCP SYN ACK packet, to indicate acceptance of a TCP connection, and the client program 28 returns a TCP ACK packet to complete the setting up of the TCP connection. Each site reports this RTT data, for each TCP connection established with a client, to the GSLB switch. The GSLB switch (e.g., GSLB switch 12) maintains a database of RTT values (such as in the first storage unit 210), which it creates and updates from data received periodically from the site switches (e.g., site switches 18A, 18B, 22A and 22B), including RTT values related to the smoothing embodiments described herein.

In one embodiment, the GSLB switch favors one host server over another only if the difference in their RTTs (or more particularly, effective RTTs, as will be described herein) with a client is greater than a specified percentage, the default specified percentage value being 10%, for example. To prevent bias, the GSLB switch 12 ignores, by default, RTT values for 5% of client queries from each responding network, for example.

FIG. 2 is a block diagram showing the functional modules of an embodiment of the GSLB switch 12 and site switch 18A (for instance) relevant to the global server load balancing function, including functions and features associated with RTT smoothing calculations. As shown in FIG. 2, the GSLB switch 12 includes a GSLB switch controller 201, health check module 202, DNS proxy module 203, metric agent 204, routing metric collector 205, and metric collector 206. The GSLB switch controller 201 provides general control functions for the operation of the GSLB switch 12. The health check module 202 is responsible for querying, either periodically or on demand, host servers and relevant applications hosted on the host servers to determine the "health" (e.g., whether or not it is available) of each host server and each relevant application. The metric collector 206 communicates with metric agents in site-specific switches (e.g., FIG. 2 shows the metric collector 206 communicating with a remote metric agent 207 of a site server load balancing ServerIron® or "SLB SI") to collect site-specific metrics (e.g., number of available sessions on a specific host server and/or connection-load data indicative of connections-per-second at that host server at the site 18A, or other metrics data). The communication protocol used between the remote metric agent 207 and the metric collector 206 can be used to communicate RTT information.

The routing metric collector 205 collects routing information from routers (e.g., topological distances between nodes on the Internet). FIG. 2 shows, for example, a router 208 providing the routing metric collector 205 with routing metrics (e.g., topological distance between the load balancing switch and the router), using the Border Gateway Protocol (BGP). The DNS proxy module 203 (A) receives incoming DNS requests, (B) provides the host names to be resolved to the DNS server 16, (C) receives from the DNS server 16 a list of responsive IP addresses, (D) orders the IP addresses on the list received from the DNS server 16, using the metrics collected by the routing-metric collector 405 and the site specific collector 406, and values of any other relevant parameter, and (E) provides the ordered list of IP addresses to the requesting DNS server. Since the GSLB switch 12 can also act as a site switch, the GSLB switch 12 is provided with the metric agent 204 for collecting metrics for a metric collector.

In one embodiment, the GSLB switch controller 201 can be programmed with and/or can access data to be used for the RTT metric and its associated calculations and application for GSLB, or data and associated calculations/applications for other metrics described in the co-pending applications identified above. In such an embodiment, the GSLB switch controller 201 can be communicatively coupled to a first storage unit 210 that contains one or more variables, values, settings, or other parameters to be used for RTT calculation. The GSLB switch controller 201 can also be communicatively coupled to a second storage unit 212 in the form of one or more counters, or other suitable data storage mechanism, to track or otherwise store values used during the course of RTT calculation and smoothing.

RTT formulas, RTT data, and other information (including software or other machine-readable instruction) can be stored in a storage medium 214. It is appreciated that the first and second storage units 210-212 may be embodied as the storage medium 214, rather than being separate components.

In an embodiment, the first storage unit 210 and/or the second storage unit 212 can be in the form of databases having tables. It is appreciated, however, that either or both of these storage units 210-212 (including information stored in the storage medium 214) can be embodied by any suitable data structure (including file systems, directory structures, variables, static or dynamic code, or any other suitable technique or structure that can accept and store policy settings and data).

Figure 3:
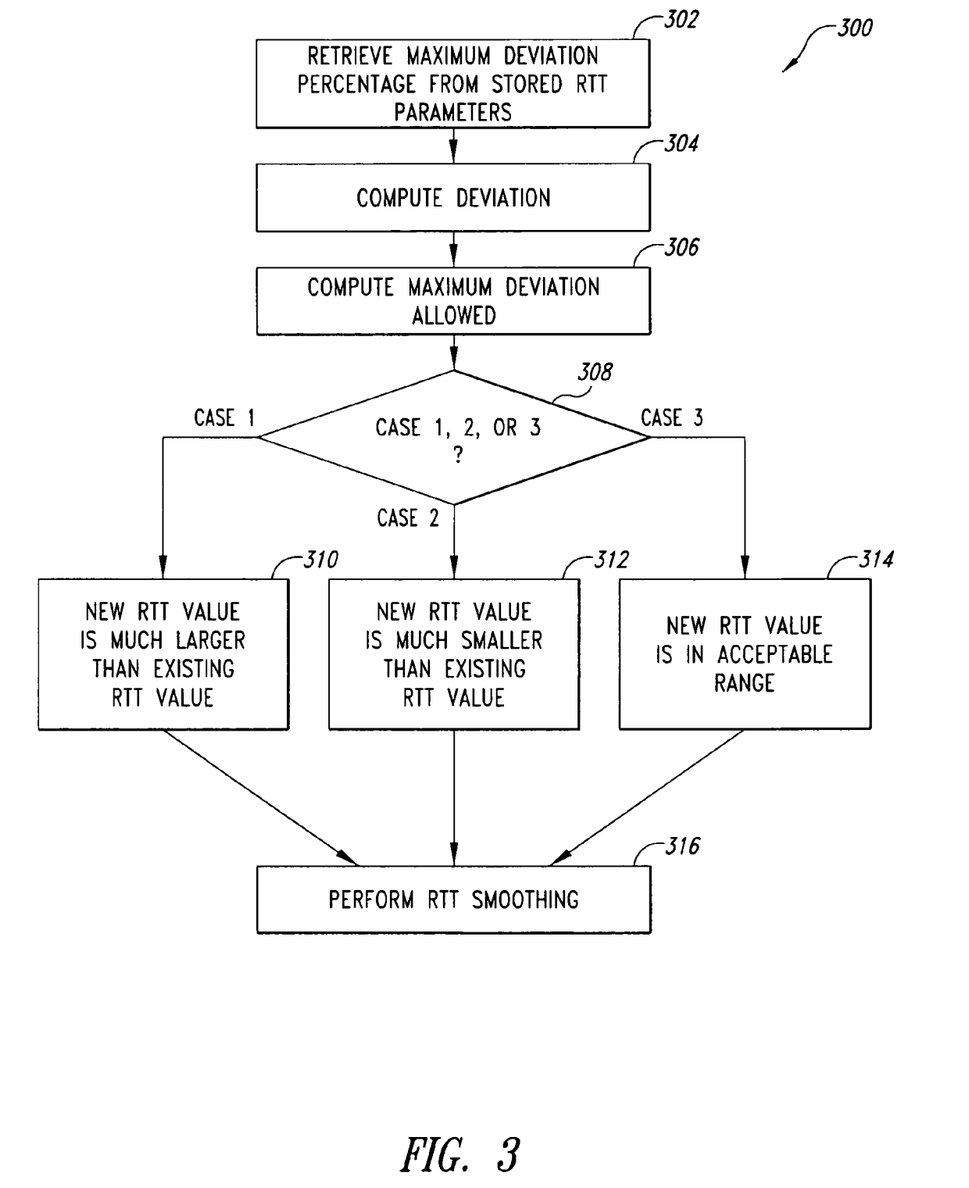
FIG. 3 is a flowchart of an embodiment of a technique to apply an RTT smoothing algorithm.

FIG. 3 is a flowchart 300 of an embodiment of a technique to configure and apply an RTT smoothing algorithm. In one embodiment, at least some of the operations depicted in the flowchart 300 (as well as in the other flowcharts shown herein) can be embodied in software, code, or other machine-readable instruction stored on a machine-readable medium, and which are executable by one or more processors. For instance, the software may be stored in the storage medium 214 and executable by the GSLB controller 201. It is appreciated that the various operations need not necessarily occur in the exact order depicted, and that certain operations can be added, removed, modified, or combined.

In an embodiment of the RTT smoothing algorithm, the GSLB switch 12 initially determines whether a RTT sample (RTT data received from the metric agent 207 of the site switch 18A, for instance) is in an acceptable range or not. That is, the GSLB switch 12 determines whether a newly received RTT sample is "too large" or "too small" as follows:

At a block 302, the GSLB switch 12 retrieves, from the parameters stored in the RTT database (e.g., the first storage unit 210), the user-configured value for the maximum deviation allowed for an RTT sample from the existing RTT value. For purposes of this example, the maximum deviation retrieved at the block 302 is a percentage value of y%. This means that if the difference between the existing RTT value and the new RTT sample is less than or equal to y% of the existing RTT value, then the new RTT sample is considered to be in the "acceptable range."

Thus at the block 302, let the maximum allowed deviation from the current RTT value=y%. Also:
Let current RTT value≦RTTold; and
Let new RTT sample=RTTnew.

The GSLB switch 12 (or more particularly in an embodiment, the GSLB controller 201) then computes a deviation as follows at a block 304:
deltaRTT=RTTnew−RTTold.

The GSLB switch 12 computes a maximum deviation allowed as follows at a block 306:
max-delta-allowed=(RTTold*y)/100.

At a block 308, the GSLB switch 12 determines whether the new RTT sample falls under one of several potential Cases 1-3. That is:

Case 1 (block 310):
If [(deltaRTT>0) and (|deltaRTT|>max-delta-allowed)], then RTTnew is much larger than the current RTT value;
Case 2 (block 312):
If [(deltaRTT<0) and (|deltaRTT|>max-delta-allowed)], then RTTnew is much smaller than the current RTT value; and
Case 3 (block 314): If Case 1 and Case 2 are false, then RTTnew value is in the acceptable range. Note that |deltaRTT| refers to the absolute value of deltaRTT (e.g., |−3| is 3 and |4| is 4).

An example illustrates application of these concepts:
Let y=200% as set by the user
Let RTTold=300 us
Let RTTnew=100 ms
Using the above method, the new RTT sample is determined to be much larger than the existing RTT value:
deltaRTT=RTTnew−RTT old=100 ms−300 us=99.7 ms
max-delta-allowed=(RTTold*y)/100=(300*200)/ 100=600 us=0.6 ms
Since (deltaRTT>0) and (|deltaRTT|>max-delta-allowed), the value of the new RTT sample is considered to be much larger than the existing RTT value in this example.

Based on the determination of whether Case 1, 2, or 3 is present, the flowchart 300 proceeds to a block 316, where RTT smoothing techniques specific to each particular Case 1-3 is performed by the GSLB switch 12. The application of these smoothing techniques/algorithms is described in further detail with reference to FIGS. 4-6.

Figure 7:
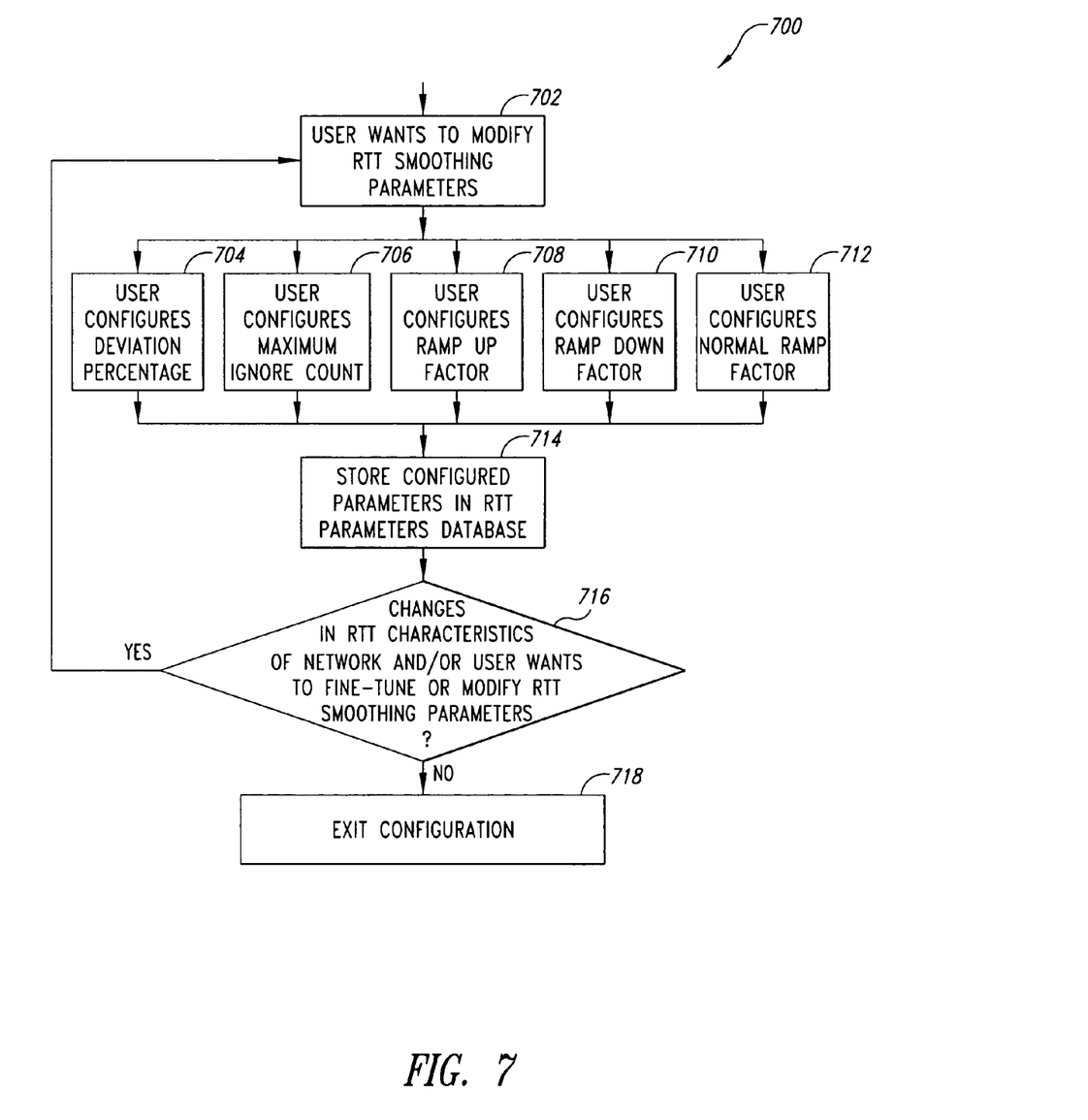
FIG. 7 is a flowchart of an embodiment to configure and adapt parameters for an RTT smoothing algorithm.

Referring generally to block 718 in FIG. 7, the user can adapt the RTT smoothing algorithm, such as by adjusting the values of the pre-set RTT parameters in the first storage unit 210 or by making other adjustments based on observation of the network behavior. For example, variations in RTT may differ from network to network. Users can determine the RTT characteristics of their networks by gathering RTT data and then fine-tune the RTT smoothing provided by an embodiment of the RTT smoothing algorithm by experimenting with the values for the smoothing parameters (e.g., maximum-deviation-allowed, mag-ignore-count, ramp-up-factor, ramp-down-factor and normal-ramp-factor, which will be explained later below). Each GSLB site (e.g., the sites 20 and 24) can be associated with a different set of values for these parameters, so that users can leverage this to fine-tune these values for each GSLB site. Specific details and examples of some of the adaptive adjustments that can be performed will be described later below with reference to FIG. 7.

Figure 4:
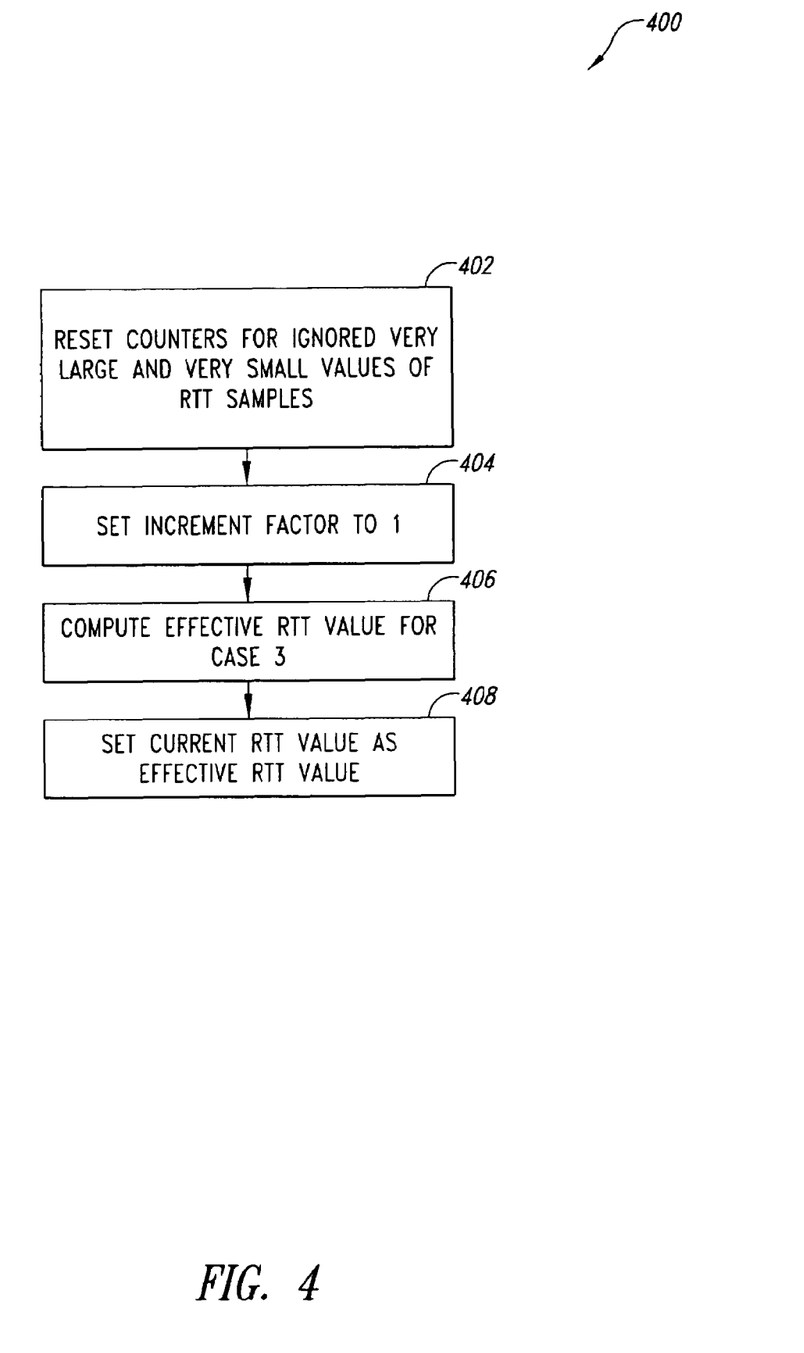
FIGS. 4-6 are more detailed flowcharts of various embodiments to apply the RTT smoothing algorithm.
Figure 5:
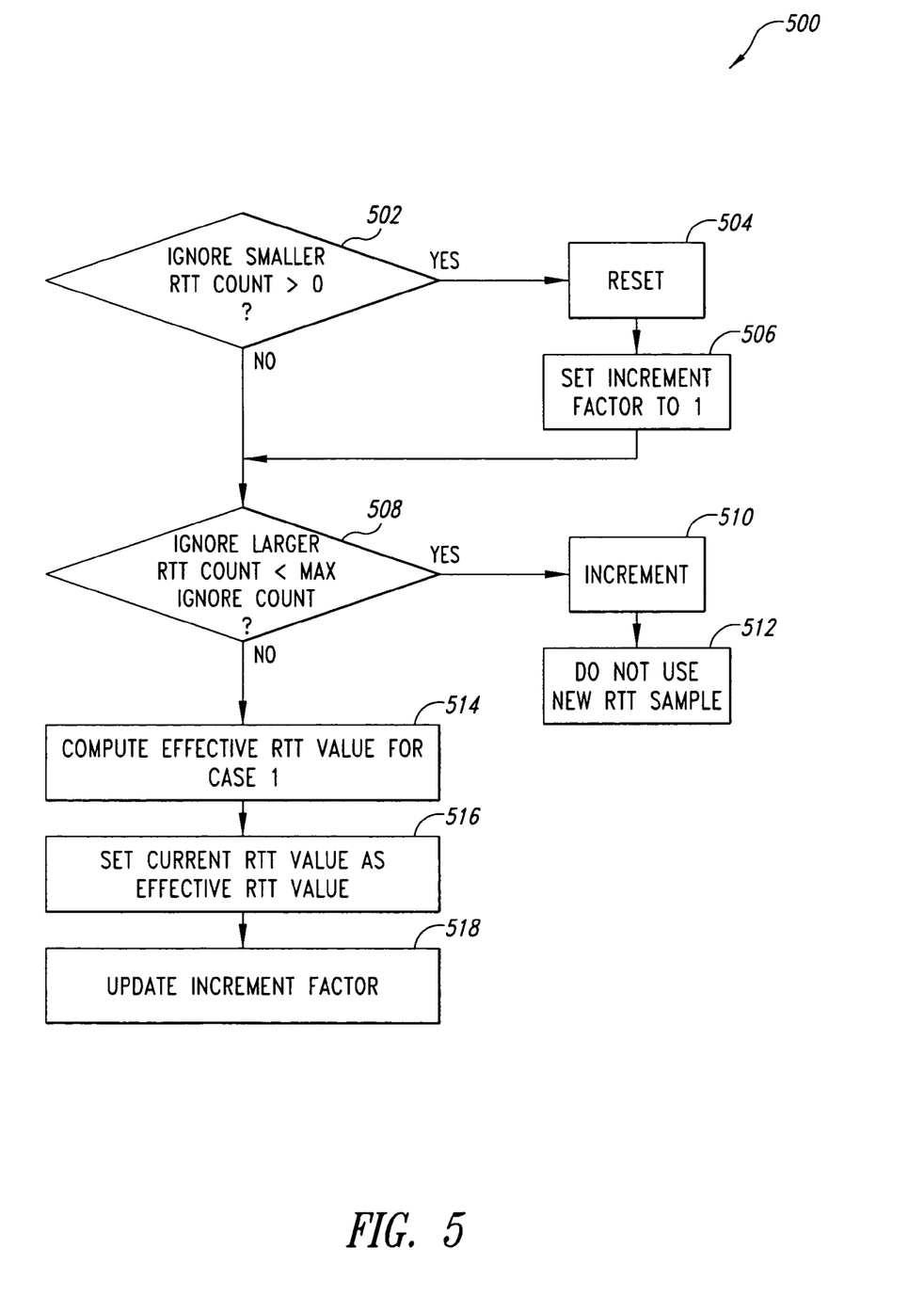
Figure 6:
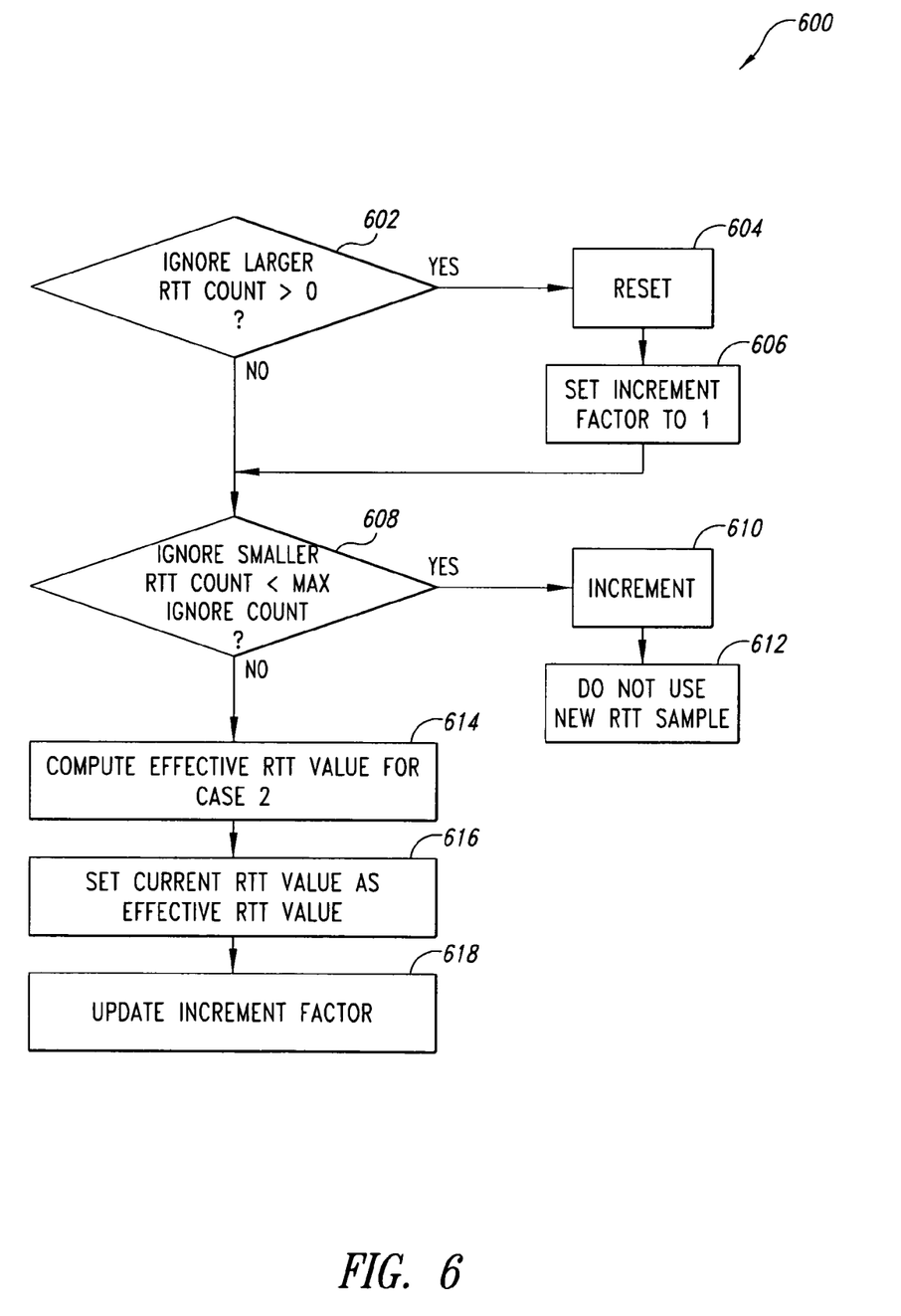

FIGS. 4-6 are more detailed flowcharts of various embodiments to apply the RTT smoothing algorithm at the block 316, based on a determination of whether Case 1, 2, or 3 exists for a new RTT sample. Initially, for purposes of smoothing the variance of RTT more effectively, the user (such as a system administrator) can define any of the following five RTT parameters, as depicted in the flowchart 700 of FIG. 7 at a block 702, and store such RTT parameters in the first storage unit 210 at a block 714):

Maximum deviation allowed: This parameter defines the maximum acceptable deviation for a RTT sample (block 704);

Maximum ignore count (max-ignore-count): This count defines how many very high or very low new RTT samples to ignore before factoring them into the existing RTT value (block 706);

Ramp up factor (ramp-up-factor): This parameter specifies the increments in which a very high new RTT sample should be factored into the existing RTT value (block 708);

Ramp down factor (ramp-down-factor): This parameter specifies the factor by which a very low new RTT sample should be factored into the existing RTT value (block 710); and Normal ramp factor (normal-ramp-factor) (around 10%, in one example embodiment): This parameter defines the factor by which a new RTT sample with an acceptable deviation from the existing RTT value, should be factored into the existing RTT value (block 712).

Additionally in an embodiment, each RTT entry will be associated with the following parameters during the course of performing the RTT smoothing algorithm:

A count (e.g., at the counters 212) that maintains how many consecutive very large values of RTT samples have been ignored for this cache entry (ignore-larger-rtt-count);

A count (e.g., also at the counters 212) that maintains how many consecutive very small values of RTT samples have been ignored for this cache entry (ignore-smaller-rtt-count); and Increment factor for RTT entry (increment-rtt-factor): This parameter determines how much of the new RTT sample should be factored into the existing RTT value.

Also, there may be other considerations when performing RTT smoothing at the block 316. For instance, when the first RTT measurement is reported for a cache entry, the initial value of RTT will be set to that measurement value. No smoothing will be done for the first RTT measurement, and RTT smoothing will be performed for subsequent RTT samples for this cache entry.

FIG. 4 is a flowchart 400 that illustrates application of the RTT smoothing algorithm in a Case 3 scenario, wherein the new RTT value is determined to be in the acceptable range (i.e., not much larger or much smaller than the existing RTT value). Starting at a block 402, the counters 212 that count the number of consecutive very large or very small RTT values that have been ignored are reset, since the new RTT value has been determined to be in the acceptable range (thereby breaking the chain of consecutive ignored RTT values). In the pseudocode, the operations at the block 402 can be expressed as:

Reset ignore-larger-rtt-count to 0; and
Reset ignore-smaller-rtt-count to 0.

Next at a block 404, the parameter (i.e., the increment factor) that determines how much of the new RTT sample should be factored into the existing RTT value is set:

Set increment-rtt-factor to 1.

The effective RTT value for Case 3 is then computed as follows at a block 406:

RTTeff=(normal-ramp-factor/100)*RTTnew+{[(100−normal-ramp-factor)/100]*RTTold},
wherein RTTold=existing value of RTT and
RTTnew=new RTT sample In this computation at the block 406, a percentage (based on the user-defined normal-ramp-factor parameter) of the new RTT value is added to a percentage (also based on the normal-ramp-factor parameter) of the existing RTT value to obtain the effective RTT value. Next at a block 408, the existing RTT value is updated by setting the computed RTT effective value as the current RTT value:

RTTold=RTTeff.

FIG. 5 is a flowchart 500 that illustrates application of the RTT smoothing algorithm in a Case 1 scenario, wherein the new RTT value is determined to be much larger than the existing RTT value. At a block 502, the GSLB switch 12 determines whether the count of ignored very small RTT values is greater than zero, and resets this count to zero at a block 504 if this condition is met. That is, since the new RTT value is much larger than the existing RTT value, the chain of consecutive ignored very small RTT values (if any) is broken. The pseudocode representation of the operation at the blocks 502-504 is:

If (ignore-smaller-rtt-count>0).
 reset ignore-smaller-rtt-count to 0.

At a block 506, the increment factor is initial set:
 Set increment-rtt-factor=1.

From the block 506 and/or from the block 502, the RTT smoothing algorithm then proceeds to a block 508, which involves determining whether the count of consecutive ignored very large RTT values is less than the maximum count of ignored very large RTT values, as defined by the user. If the current count is less than the maximum count, then the current count is incremented at a block 510, and the new RTT value/sample is not used (i.e., is ignored) at a block 512. The pseudocode representation is as follows:

If (ignore-larger-rtt-count<max-ignore-count),
 increment ignore-larger-rtt-count by 1.
 Do not use this RTT sample.

Otherwise at a block 514, the effective RTT value is computed, as the maximum count of very large RTT values has been exceeded, indicating that the large RTT samples are probably not an anomaly and probably justify an adjustment in the current RTT value. The effective value of the RTT is computed at the block 514 as follows:

RTTeff={(100−increment-rtt-factor)/100}*RTTold+(increment-rtt-factor/100)*RTTnew,
wherein RTTold=existing value of RTT and
RTTnew=new RTT sample.

In this computation at the block 514, the effective RTT value is determined as a sum of the percentage of the new and existing RTT values, wherein the percentage is based on the increment factor (which is set to 1 initially). Therefore, with regards to the first new very large RTT value, 1% of the new RTT value is added to 99% of the existing RTT value. These percentages will be adjusted in the presence of subsequent very large RTT sample values.

Next at a block 516, the existing RTT value is updated by setting the computed RTT effective value as the current RTT value:

RTTold=RTTeff.

At a block 518, the increment factor is updated as follows:
If (increment-rtt-factor<normal-ramp-factor),
 increment-rtt-factor=increment-rtt-factor+ramp-up-factor; or If (increment-rtt-factor>normal-ramp-factor),
  increment-rtt-factor=normal-ramp-factor.

This updating at the block 518 results in an additive increase. That is, whenever the increment factor remains less than the normal ramp factor, the increment factor is increased by adding the increment factor to the ramp up factor, thereby resulting in a progressively higher percentage of new very large RTT values (and progressively lower percentage of existing RTT values) being used for the computation of the effective RTT value at the block 514. Once the increment factor exceeds the normal ramp factor, the increment factor is set/remains at the normal ramp factor for the computation of the effective RTT value.

FIG. 6 is a flowchart 600 that illustrates application of the RTT smoothing algorithm in a Case 2 scenario, wherein the new RTT value is determined to be much smaller than the existing RTT value. At a block 602, the GSLB switch 12 determines whether the count of ignored very large RTT values is greater than zero, and resets this count to zero at a block 604 if this condition is met. That is, since the new RTT value is much smaller than the existing RTT value, the chain of consecutive ignored very large RTT values (if any) is broken. The pseudocode representation of the operation at the blocks 602-604 is:

If (ignore-larger-rtt-count>0).
  reset ignore-larger-rtt-count to 0.

At a block 606, the increment factor is initially set:
  Set increment-rtt-factor=1.

From the block 606 and/or from the block 602, the RTT smoothing algorithm then proceeds to a block 608, which involves determining whether the count of consecutive ignored very small RTT values is less than the maximum count of ignored very small RTT values, as defined by the user. If the current count is less than the maximum count, then the current count is incremented at a block 610, and the new RTT value/sample is not used (i.e., is ignored) at a block 612. The pseudocode representation is as follows:

If (ignore-smaller-rtt-count<max-ignore-count),
  increment ignore-smaller-rtt-count by 1.
  Do not use this RTT sample.

Otherwise at a block 614, the effective RTT value is computed, as the maximum count of very small RTT values has been exceeded, indicating that the small RTT samples are probably not an anomaly and probably justify an adjustment in the current RTT value. The effective value of the RTT is computed at the block 614 as follows:

RTTeff={(100−increment-rtt-factor)/100}*RTTold−(increment-rtt-factor/100)*(RTTold−RTTnew),
  wherein RTTold=existing value of RTT and
  RTTnew=new RTT sample.

In this computation at the block 614, the effective RTT value is determined as a sum of the percentage of the new and existing RTT values, wherein the percentage is based on the increment factor (which is set to 1 initially). Therefore, with regards to the first new very small RTT value, 1% of the new RTT value is added to 98% of the existing RTT value. These percentages will be adjusted in the presence of subsequent very small RTT sample values.

Next at a block 616, the existing RTT value is updated by setting the computed RTT effective value as the current RTT value:
  RTTold=RTTeff.

At a block 618, the increment factor is updated as follows:
If (increment-rtt-factor<normal-ramp-factor),
  increment-rtt-factor=increment-rtt-factor*ramp-down-factor; or
If (increment-rtt-factor>normal-ramp-factor),
  increment-rtt-factor=normal-ramp-factor.

This updating at the block 618 results in multiplicative increase. That is, whenever the increment factor remains less than the normal ramp factor, the increment factor is increased by multiplying the increment factor with the ramp down factor, thereby resulting in a progressively higher percentage of new very small RTT values (and progressively lower percentage of existing RTT values) being used for the computation of the effective RTT value at the block 614. Once the increment factor exceeds the normal ramp factor, the increment factor is set/remains at the normal ramp factor for the computation of the effective RTT value.

Once the effective RTT value has been computed for any of the Cases 1-3 as depicted in FIGS. 4-6, the effective RTT value is stored until the next computational update. The current value of the effective RTT value is used in the RTT metric in the GSLB algorithm, whether singly or in combination with other metrics, to reorder an IP address list in a DNS reply to place an optimum IP address at the top.

With reference back to the adaptation capability depicted in FIG. 7, the user can adjust certain RTT parameter values in order to improve the efficiency and/or accuracy of the RTT smoothing algorithm. The following are some examples.

A) Maximum deviation allowed (block 704): If the user typically observes RTT values in a particular range and then observes that when there is a spike in the RTT value, the deviation between the old and new RTT value is typically, say 500%, of the existing RTT value, then the user can use this information to determine the optimal value for maximum deviation allowed. The user can fine tune the value of maximum deviation allowed (e.g., y% that is set at the block 302 in the scenario previously described above), which in turn will determine which RTT samples should be considered very large or very small as compared to the current RTT (i.e., RTTold). Any suitable default value for this y% parameter can be used, such as 400%.

B) Maximum ignore count (block 706): This count specifies how many extremely high or extremely low RTT values to ignore. The default value can be 3 or other suitable number. If the user observes that just one spike typically occurs in the RTT once in a while, the user can set this parameter to 1. If the user does not want to ignore any samples, the user can set this parameter to 0.

C) Ramp up factor (block 708): The increment-rtt-factor specifies how much of the new RTT sample value should be used in computing the effective RTT. The ramp-up-factor specifies how much the increment-rtt-factor should be increased for each consecutive extremely large value of RTT. This is an additive increase in one embodiment (e.g., new increment-rtt-factor=old increment-rtt-factor+ramp-up-factor). The ramp-up-factor by default can be 2 or other suitable amount. Note that in an embodiment, the increment-rtt-factor value is bounded by the normal-ramp-factor. This means that if the ramp-up-factor is 2 and normal-ramp-factor is 10, then the increment-rtt-factor will increase as follows: 1,3,5,7,9,10.

The effective value of RTT is computed as follows in one embodiment:
  RTTtemp=(increment-rtt-factor/100)*RTTnew+[(100−increment-rtt-factor)100]*RTTold;
  RTTold=RTTtemp.

If the user has set a high value for max-ignore-count, then the user may want the RTT value to ramp up quickly. The reason is that the GSLB switch 12 has already ignored enough RTT samples with high values. If the GSLB switch 12 is still detecting high values, this means that such values are not anomalies—in reality, the RTT has increased, and the GSLB switch needs to factor this increased RTT into the existing RTT value quickly. The user can set the ramp-up-factor to a higher value in order to achieve this. Note that the increment-rtt-factor is bounded by the normal-ramp-factor in one embodiment, and hence, the user may need to fine-tune both ramp-up-factor and the normal-ramp-factor if a faster ramp up in the RTT value is desired.

D) Ramp down factor (block 710): The increment-rtt-factor specifies how much of the new RTT sample value should be used in computing the effective RTT. The ramp-down-factor specifies how much the increment-rtt-factor should be increased for each consecutive extremely small value of RTT. This is a multiplicative increase (e.g., new increment-rtt-factor=old increment-rtt-factor*ramp-down-factor).

The ramp-down-factor by default can be any suitable number, such as 3. Note that the increment-rtt-factor value is bounded in one embodiment by the normal-ramp-factor. This means that if the ramp-down-factor is 3 and normal-ramp-factor is 10, then the increment-rtt-factor will increase as follows: 1,3,9,10.

The effective value of RTT will be computed by the GSLB switch 12 as follows RTTtemp={(100−increment-rtt-factor)/100}*RTTold−(increment-rtt-factor/100)*(RTTold−RTTnew);

RTTold=RTTtemp.

Again as described earlier, if the user has set a high value for max-ignore-count, then the user may want the RTT value to ramp down quickly. The user can set the ramp-down-factor to a higher value in order to achieve this. Note that the increment-rtt-factor is bounded by the normal-ramp-factor in an embodiment, and hence, the user may need to fine-tune both the ramp-down-factor and the normal-ramp-factor if a faster ramp down in the RTT value is desired.

In an embodiment, the enhanced RTT smoothing algorithm may be selectively enabled or disabled, which may be performed in accordance with the configuration shown in FIG. 7 or at any other suitable configuration time. Using command line interface (CLI) commands or other appropriate user input technique, the enhanced RTT smoothing algorithm may be enabled globally or disabled globally for all sites for which the GSLB switch 12 is providing GSLB. In an embodiment, the enhanced RTT smoothing algorithm is disabled by default, which means that the old method of computing effective RTT values (i.e., effective RTT=90% of old RTT value+10% of new RTT value) will be used.

In some embodiments, the enhanced RTT smoothing algorithm can be selectively enabled for some sites and disabled for others. Different sets of RTT parameters (e.g., maximum deviation allowed, maximum ignore count, normal ramp factor, ramp up factor, ramp down factor, and the like) can be specified or otherwise defined for each site. Moreover, the user can be provided with mechanisms to simulate RTT smoothing prior to deployment or for testing or adaptation purposes, such as shown in FIG. 7. Suitable user interfaces can be provided to allow the user to view RTT data and RTT settings.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

For example, various embodiments have been described with respect to RTT that is computed based on the time interval(s) involved in a TCP SYN/ACK exchange between the client program 28 and one of the site switches (18A, 18B, 22A, or 22B). It is appreciated that RTT in other embodiments can be based on time interval(s) involved in communication exchanges (whether direct or indirect) between other types of network devices. Moreover, such embodiments need not necessarily be based on or use a TCP SYN/ACK format for purposes of calculating RTT.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
defining a maximum deviation allowed for any round trip time (RTT) sample relative to a current RTT value;
computing a deviation of a RTT sample relative to the current RTT value;
if the computed deviation is greater than zero and greater than the maximum deviation allowed, then performing a first type of RTT smoothing operation wherein the RTT sample is factored into the current RTT value using an additive increase;
if the computed deviation is less than zero and an absolute value of the computed deviation is greater than the maximum deviation allowed, then performing a second type of RTT smoothing operation wherein the RTT sample is factored into the current RTT value using a multiplicative decrease; and
otherwise performing a third type of RTT smoothing operation wherein a percentage of the RTT sample is factored into a percentage of the current RTT value.

2. The method of claim 1, further comprising ignoring and counting a plurality of RTT samples whose absolute value of computed deviations relative to the current RTT value exceed the maximum deviation allowed, until a count of ignored RTT samples exceed a maximum ignore count.

3. The method of claim 1 wherein said defining the maximum deviation allowed for any RTT sample relative to the current RTT value includes defining the maximum deviation allowed as a percentage deviation from the current RTT value.

4. The method of claim 1 wherein the current RTT value into which the RTT sample is factored includes an effective RTT value, the method further comprising using the effective RTT value as a metric to load balance traffic to at least one network address.

5. The method of claim 1 wherein said performing the first type of RTT smoothing operation wherein the RTT sample is factored into the current RTT value using the additive increase includes:
setting an increment factor;
reducing the current RTT value by a first percentage based on the increment factor;
reducing the RTT sample by a second percentage based on the increment factor;
adding the reduced current RTT value to the reduced RTT sample to obtain an effective RTT value;

adding the increment factor to a ramp up factor to obtain a new increment factor, if the increment factor is less than a normal ramp factor;

setting the new increment factor equal to the normal ramp factor, if the increment factor exceeds the normal ramp factor; and using the new increment factor for at least one subsequent first type of RTT smoothing operation to obtain a new effective RTT value.

6. The method of claim 1 wherein said performing the second type of RTT smoothing operation wherein the RTT sample is factored into the current RTT value using the multiplicative decrease includes:

setting an increment factor;

reducing the current RTT value by a first percentage based on the increment factor;

reducing the RTT sample by a second percentage based on the increment factor;

subtracting the reduced RTT sample from the reduced current RTT value to obtain an effective RTT value;

multiplying the increment factor with a ramp down factor to obtain a new increment factor, if the increment factor is less than a normal ramp factor;

setting the new increment factor equal to the normal ramp factor, if the increment factor exceeds the normal ramp factor; and using the new increment factor for at least one subsequent second type of RTT smoothing operation to obtain a new effective RTT value.

7. The method of claim 1, further comprising adapting parameters of at least one of the first, second, and third types of RTT smoothing operations in response to network characteristics.

8. The method of claim 7 wherein said adapting the parameters includes adapting at least one of the maximum deviation allowed, a maximum count of ignored RTT samples that exceed the maximum deviation allowed, a ramp up factor that specifies increments in which a large RTT sample that exceeds the maximum deviation allowed should be factored into the current RTT value, a ramp down factor that specifies increments in which a small RTT sample that exceeds the maximum deviation allowed should be factored into the current RTT value, and a normal ramp factor that specifies how much a RTT sample that is less than or equal to the maximum deviation allowed should be factored into the current RTT value.

9. The method of claim 1, further comprising applying none of the first, second, and third RTT smoothing operations to a first current RTT value.

10. The method of claim 1, further comprising selectively enabling or disabling the first and second types of RTT smoothing operations for different sites that are being load balanced.

11. A method, comprising:

determining whether an allowed maximum deviation of a round trip time (RTT) sample relative to a current RTT value is exceeded;

if the RTT sample is larger than the current RTT value so as to exceed the allowed maximum deviation, adjusting the current RTT value using a first type of RTT smoothing operation;

if the RTT sample is smaller than the current RTT value so as to exceed the allowed maximum deviation, adjusting the current RTT value using a second type of RTT smoothing operation;

if the RTT sample relative to the current RTT value is within the allowed maximum deviation, adjusting the current RTT value using a third type of RTT smoothing operation; and ignoring and counting a plurality of RTT samples whose computed deviations relative to the current RTT value exceed the allowed maximum deviation, until a count of ignored RTT samples exceed a maximum ignore count.

12. The method of claim 11 wherein said adjusting the current RTT value using the first type of RTT smoothing operation includes using an additive increase that adds progressively increasing percentages of RTT samples to corresponding progressively decreasing percentages of current RTT values.

13. The method of claim 12 wherein said using the first type of RTT smoothing operation that includes using the additive increase includes:

reducing the current RTT value by a first percentage based on an increment factor;

reducing the RTT sample by a second percentage based on the increment factor;

adding the reduced current RTT value to the reduced RTT sample to obtain an effective RTT value;

adding the increment factor to a ramp up factor to obtain a new increment factor, if the increment factor is less than a normal ramp factor;

setting the new increment factor equal to the normal ramp factor, if the increment factor exceeds the normal ramp factor; and using the new increment factor for at least one subsequent first type of RTT smoothing operation to obtain a new effective RTT value.

14. The method of claim 11 wherein said adjusting the current RTT value using the second type of RTT smoothing operation includes using multiplicative decrease that adds progressively increasing percentages of RTT samples to corresponding progressively decreasing percentages of current RTT values.

15. The method of claim 14 wherein said using the second type of RTT smoothing operation that includes using the multiplicative decrease includes:

reducing the current RTT value by a first percentage based on an increment factor;

reducing the RTT sample by a second percentage based on the increment factor;

subtracting the reduced RTT sample from the reduced current RTT value to obtain an effective RTT value;

multiplying the increment factor with a ramp down factor to obtain a new increment factor, if the increment factor is less than a normal ramp factor;

setting the new increment factor equal to the normal ramp factor, if the increment factor exceeds the normal ramp factor; and using the new increment factor for at least one subsequent second type of RTT smoothing operation to obtain a new effective RTT value.

16. The method of claim 11 wherein said adjusting the current RTT value using the third type of RTT smoothing operation includes factoring a percentage of the RTT sample into a percentage of the current RTT value.

17. The method of claim 11, further comprising using the adjusted current RTT value as a metric to load balance traffic to at least one network address.

18. A method, comprising:

determining whether an allowed maximum deviation of a round trip time (RTT) sample relative to a current RTT value is exceeded;

if the RTT sample is larger than the current RTT value so as to exceed the allowed maximum deviation, adjusting the current RTT value using a first type of RTT smoothing operation;
if the RTT sample is smaller than the current RTT value so as to exceed the allowed maximum deviation, adjusting the current RTT value using a second type of RTT smoothing operation; and
if the RTT sample relative to the current RTT value is within the allowed maximum deviation, adjusting the current RTT value using a third type of RTT smoothing operation; and
at least one of:
   a) wherein said adjusting the current RTT value using the first type of RTT smoothing operation includes using an additive increase that adds progressively increasing percentages of RTT samples to corresponding progressively decreasing percentages of current RTT values;
   b) wherein said adjusting the current RTT value using the second type of RTT smoothing operation includes using a multiplicative decrease that adds progressively increasing percentages of RTT samples to corresponding progressively decreasing percentages of current RTT values; and
   c) wherein said adjusting the current RTT value using the third type of RTT smoothing operation includes factoring a percentage of the RTT sample into a percentage of the current RTT value.

19. The method of claim 18, further comprising:
using the adjusted current RTT value as a metric to load balance traffic to at least one network address.

20. The method of claim 18, further comprising adapting parameters of at least one of the first, second, and third types of RTT smoothing operations in response to network characteristics.

21. A computer-readable medium that stores instructions executable by a processor to:
obtain a maximum deviation allowed for any round trip time (RTT) sample relative to a current RTT value;
compute a deviation of a RTT sample relative to the current RTT value;
perform a first type of RTT smoothing operation to factor the RTT sample into the current RTT value using an additive increase, if the computed deviation is greater than zero and greater than the maximum deviation allowed;
perform a second type of RTT smoothing operation to factor the RTT sample into the current RTT value using a multiplicative decrease, if the computed deviation is less than zero and greater than the maximum deviation allowed; and
otherwise perform a third type of RTT smoothing operation to factor a fixed percentage of the RTT sample into a fixed percentage of the current RTT value.

22. The computer-readable medium of claim 21, further including instructions stored thereon that are executable by said processor to:
ignore and count a plurality of RTT samples whose computed deviations relative to the current RTT value exceed the maximum deviation allowed, until a count of ignored RTT samples exceed a maximum ignore count.

23. The computer-readable medium of claim 21 wherein the instructions to perform the first type of RTT smoothing operation to factor the RTT sample into the current RTT value using the additive increase include instructions executable by said processor to:
reduce the current RTT value by a first percentage based on an increment factor;
reduce the RTT sample by a second percentage based on the increment factor;
add the reduce current RTT value to the reduced RTT sample to obtain an effective RTT value;
add the increment factor to a ramp up factor to obtain a new increment factor, if the increment factor is less than a normal ramp factor;
set the new increment factor equal to the normal ramp factor, if the increment factor exceeds the normal ramp factor; and
use the new increment factor for at least one subsequent first type of RTT smoothing operation to obtain a new effective RTT value.

24. The computer-readable medium of claim 21 wherein the instructions to perform the second type of RTT smoothing operation to factor the RTT sample into the current RTT value using the multiplicative decrease include instructions executable by said processor to:
reduce the current RTT value by a first percentage based on an increment factor;
reduce the RTT sample by a second percentage based on the increment factor;
subtract the reduced RTT sample from the reduced current RTT value to obtain an effective RTT value;
multiply the increment factor with a ramp down factor to obtain a new increment factor, if the increment factor is less than a normal ramp factor;
set the new increment factor equal to the normal ramp factor, if the increment factor exceeds the normal ramp factor; and
use the new increment factor for at least one subsequent second type of RTT smoothing operation to obtain a new effective RTT value.

25. The computer-readable medium of claim 21, further including instructions stored thereon that are executable by said processor to:
use the current RTT value, having the RTT sample factored thereto, as a metric to load balance network traffic.

26. A system, comprising:
storage means for storing at least one round trip time (RTT) value; and
means for determining whether an allowed maximum deviation of a round trip time (RTT) sample relative to a current RTT value is exceeded; for adjusting the current RTT value using a first type of RTT smoothing operation, if the RTT sample is larger than the current RTT value so as to exceed the allowed maximum deviation; for adjusting the current RTT value using a second type of RTT smoothing operation, if the RTT sample is smaller than the current RTT value so as to exceed the allowed maximum deviation; and for adjusting the current RTT value using a third type of RTT smoothing operation, if the RTT sample relative to the current RTT value is within the allowed maximum deviation; and
at least one of:
   a) wherein the means for adjusting the current RTT value using the first type of RTT smoothing operation uses an additive increase that adds progressively increasing percentages of RTT samples to corresponding progressively decreasing percentages of current RTT values;

b) wherein the means for adjusting the current RTT value using the second type of RTT smoothing operation uses a multiplicative decrease that adds progressively increasing percentages of RTT samples to corresponding progressively decreasing percentages of current RTT values; and c) wherein said means for adjusting the current RTT value using the third type of RTT smoothing operation factors a percentage of the RTT sample into a percentage of the current RTT value.

27. The system of claim 26, further comprising:

means for adapting parameters of at least one of the first, second, and third types of RTT smoothing operations in response to network characteristics.

28. The system of claim 26, further comprising means for using the adjusted current RTT value as a metric, either singly or in combination with other metrics, to load balance network traffic.

* * * * *